(12) United States Patent
Briggs et al.

(10) Patent No.: US 9,719,835 B2
(45) Date of Patent: Aug. 1, 2017

(54) DOUBLE-SIDE THICK FILM NETWORK ON CERAMIC CARD

(71) Applicant: Continental Automotive Systems, Inc., Auburn Hills, MI (US)

(72) Inventors: Paul F Briggs, Grand Blanc, MI (US); John Patrick Wattai, Rochester Hills, MI (US); Matthias Kadler, Gross-Gerau (DE); Robert Peter, Sulzbach (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 261 days.

(21) Appl. No.: 14/716,322

(22) Filed: May 19, 2015

(65) Prior Publication Data

US 2015/0338264 A1  Nov. 26, 2015

Related U.S. Application Data

(60) Provisional application No. 62/001,996, filed on May 22, 2014.

(51) Int. Cl.
| | | |
|---|---|---|
| *G01F 23/36* | (2006.01) | |
| *H01R 12/72* | (2011.01) | |
| *H01H 21/22* | (2006.01) | |

(52) U.S. Cl.
CPC .......... *G01F 23/363* (2013.01); *H01H 21/22* (2013.01); *H01R 12/72* (2013.01)

(58) Field of Classification Search
CPC ........ G01F 23/363; H01H 21/22; H01R 12/72
USPC ............................................................. 73/313
See application file for complete search history.

(56) References Cited

U.S. PATENT DOCUMENTS

| | | | | |
|---|---|---|---|---|
| 5,357,815 A | * | 10/1994 | Williamson | ............ G01F 23/36 338/33 |
| 2004/0007062 A1 | * | 1/2004 | Ireland | .................. G01F 23/363 73/313 |
| 2006/0219003 A1 | * | 10/2006 | Forgue | ................... B01D 35/26 73/313 |
| 2010/0263443 A1 | * | 10/2010 | Mattmann | ............... G01F 23/38 73/290 R |

\* cited by examiner

*Primary Examiner* — Hezron E Williams
*Assistant Examiner* — Marrit Eyassu

(57) ABSTRACT

A ceramic card having a thick film network, with conductive vias formed as part of the card. Each of the vias is in electrical communication with both sides of the thick film network, allowing the pads and the pad senders to be formed on both sides of the card. This configuration maintains the contact when one of the connectors is subjected to bending force or is otherwise displaced, maintaining contact with at least one of the pads, and allowing the system to still function. The double sided thick film network allows for each connector to touch both sides of one of the pads, and still maintain electrical communication with the level sender, thus eliminating the failure mode of intermittent contact with the thick film network resulting from movement of the connector.

17 Claims, 9 Drawing Sheets

DOUBLE-SIDE THICK FILM NETWORK ON CERAMIC CARD

CROSS-REFERENCE TO RELATED APPLICATIONS

This application claims the benefit of U.S. Provisional Application No. 62/001,996 filed May 22, 2014. The disclosure of the above application is incorporated herein by reference.

FIELD OF THE INVENTION

The invention relates generally to a connector for a double-sided thick film network card for a level sender in a fuel module.

BACKGROUND OF THE INVENTION

Level senders in fuel modules are generally known, and are disposed in gas tanks of vehicles for detecting the level of fuel in the fuel tank. Typical fuel modules have a level sender with some type of circuit disposed on a network card. There is also a float connected to a lever assembly, and the lever assembly is connected to some type of bracket that is in contact with the network card. As the float changes position within the gas tank as the fuel level changes, the bracket changes position relative to the card, and therefore changes the configuration of the circuit, producing a signal corresponding to the level of fuel in the fuel tank.

It is common for these types of cards to have the circuit disposed on one side of the card, where a connector is in contact with one of the pads that is part of the circuit. The connector therefore only contacts one side of the pad. The connector has a wire that extends into another connector, which is connected to the flange of the fuel module.

The connection between a connector and a pad on the network card is subject to becoming disconnected due to the connector moving out of position, and losing contact with one of the pads. There is very little support for maintaining the proper location of the connector relative to the corresponding pad. When the connector is exposed to various bending forces, the connector may temporarily lose contact with the pad, or become disconnected from the pad completely.

Accordingly, there exists a need for a connector which maintains contact with a thick film network card even when exposed to bending forces.

SUMMARY OF THE INVENTION

The present invention is a ceramic card having a thick film network, with conductive vias formed as part of the card. Each of the vias is in electrical communication with both sides of the thick film network, allowing the pads and pad senders to be formed on both sides of the card. This configuration maintains the contact when one of the connectors is subjected to bending force or is otherwise displaced, maintaining contact with at least one of the pads, and allowing the system to still function.

The double sided thick film network allows for each connector to touch both sides of one of the pads, and still maintain electrical communication with the level sender, thus eliminating the failure mode of intermittent contact with the thick film network card resulting from movement of the connector.

In one embodiment, the present invention is a sensor assembly, which includes a card, a circuit disposed on the card, and a first pad and a second pad located on the card, where the first pad and the second pad are part of the circuit. There is a first connector connected to the first pad, and a second connector connected to a second pad. A first arcuate portion and a second arcuate portion are also located on the card, and the first arcuate portion and the second arcuate portion are both part of the circuit. A first pad sender is part of the circuit and located on the card, and places the first pad in electrical communication with the first arcuate portion. A second pad sender is also part of the circuit and located on the card, and places the second pad in electrical communication with the second arcuate portion. The circuit also includes a first via and a second via, where the first via is in communication with the first pad sender such that the first via provides communication between portions of the first pad sender on both sides of the card, and the second via is in communication with the second pad sender such that the second via provides communication between portions of the second pad sender on both sides of the card.

A bracket assembly is in sliding contact with the first arcuate portion and the second arcuate portion of the circuit. As the bracket assembly changes position relative to the first arcuate portion and the second arcuate portion, the resistance of the circuit changes such that a signal indicative of the position of the bracket assembly is generated by the circuit.

The sensor assembly also includes a lever assembly connected to the bracket assembly, and a float connected to the lever. As the float changes position, the lever assembly pivots relative to the bracket assembly and the float, and the bracket assembly pivots relative to the first arcuate portion and the second arcuate portion such that the configuration of the circuit changes, and the circuit generates a signal indicating the position of the float. The signal is then used to provide an indication of how much fuel is in a fuel tank.

The sensor assembly also includes a housing, and a cover connected to the housing. The bracket assembly is located between the cover and the housing, such that the bracket assembly is pivotally connected to the cover and the housing.

A first notch is formed as part of the housing, and a second notch is formed as part of the cover. The connection between the cover and the housing also forms a plurality of cavities. The first notch is located in proximity to the second notch, and the first notch and second notch are located in proximity to at least one of the plurality of cavities when the housing is connected to the cover. Each connector includes a connector housing, and a first retention feature and a second retention feature are integrally formed with the connector housing. There is also a first flange portion and a second flange portion integrally formed with the connector housing. The first retention feature is in contact with the first notch and the second retention feature is in contact with the second notch, maintaining the first flange portion and second flange portion in contact with both sides of the pads.

Each connector also includes a first protrusion integrally formed with the first flange portion creating a first inflection point, and a second protrusion integrally formed with the second flange portion, creating a second inflection point. The first protrusion and the second protrusion contact the card when the connector is being connected to the card such that the force applied to the connector causes the first flange portion, second flange portion, first protrusion, and second protrusion to deflect, allowing the card to be placed between the first inflection point and the second inflection point, placing the connector in electrical communication with the pad. The connection between each connector and a corresponding pad is substantially similar.

In an embodiment, the circuit is made of conductive ink. Portions of the conductive ink are disposed on both sides of the card such that a portion of the first pad, a portion of the second pad, a portion of the first pad sender, and a portion of the second pad sender are formed on both sides of the card. In an embodiment, the card is made of ceramic material, but it is within the scope of the invention that other materials may be used.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
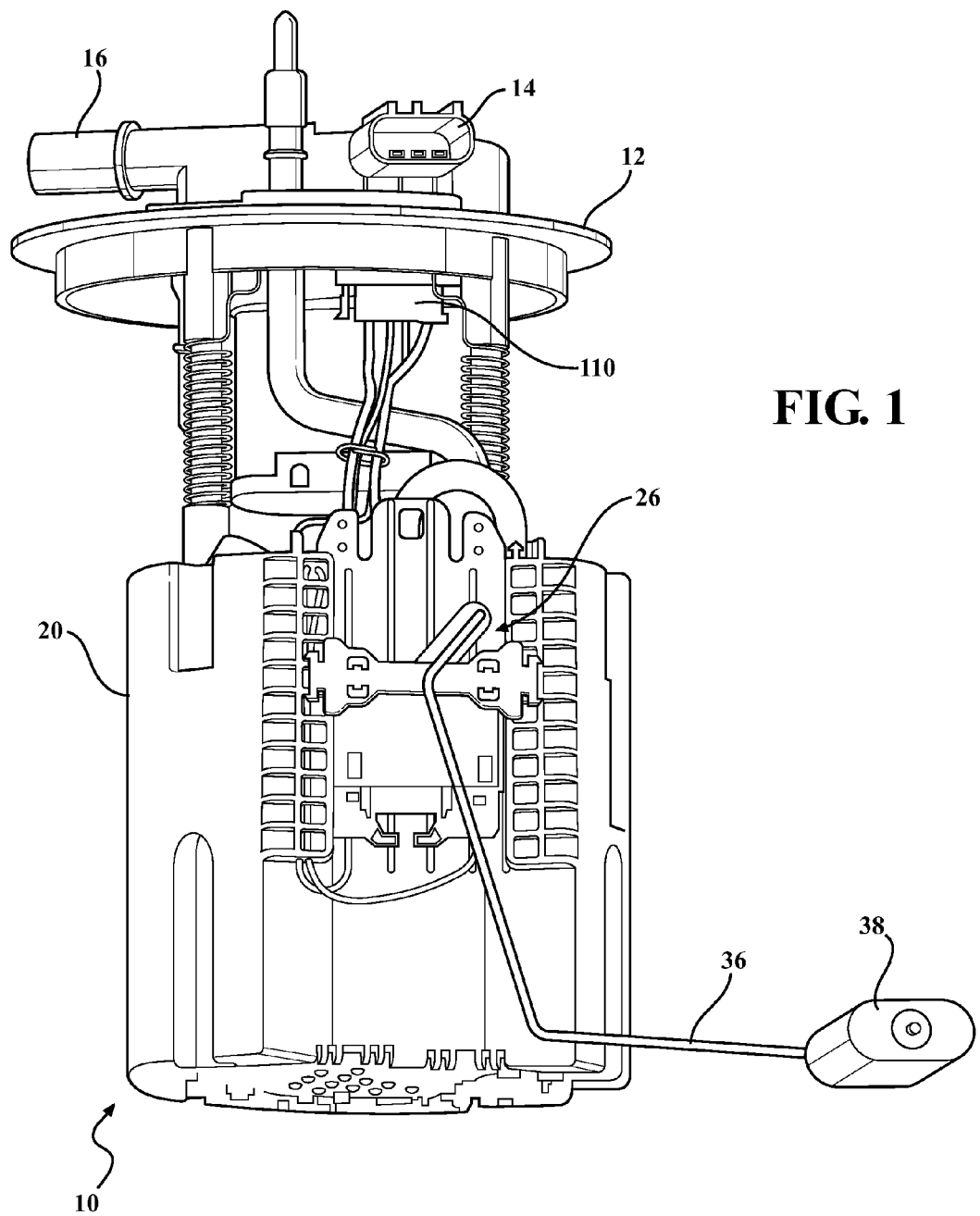
FIG. 1 is a first perspective view of a fuel module having a sensor assembly, according to embodiments of the present invention.

The following description of the preferred embodiment(s) is merely exemplary in nature and is in no way intended to limit the invention, its application, or uses.

A fuel module having a thick film network (TFN) sensor card is shown in the Figures generally at 10. Referring to the Figures generally, the fuel module 10 includes a flange 12, where the flange 12 has a connector 14 integrally formed as part of the flange 12, and a port 16 which is also formed as part of the flange 12. The fuel module 10 also includes a fuel pump 18 located in a reservoir 20, along with a filter 22, and various connectors and hoses. The fuel pump 18 functions to transfer fuel from the reservoir 20 through the various connectors and hoses, and out of the port 16.

Also partially disposed in the reservoir 20 is a holder assembly 24, which is connected to a sidewall of the reservoir 20. The holder assembly 24 supports a sensor assembly, shown generally at 26. The sensor assembly 26 includes a housing 28 attached to a cover 30, and disposed between the housing 28 and the cover 30 is a TFN card 32. In this embodiment, the card 32 is made of a ceramic material, but it is within the scope of the invention that other materials may be used. Also located between the housing 28 and the cover 30 is a bracket assembly 34, and connected to the bracket assembly 34 is a lever assembly 36, and connected to the lever assembly 36 is a float 38.

Figure 3:
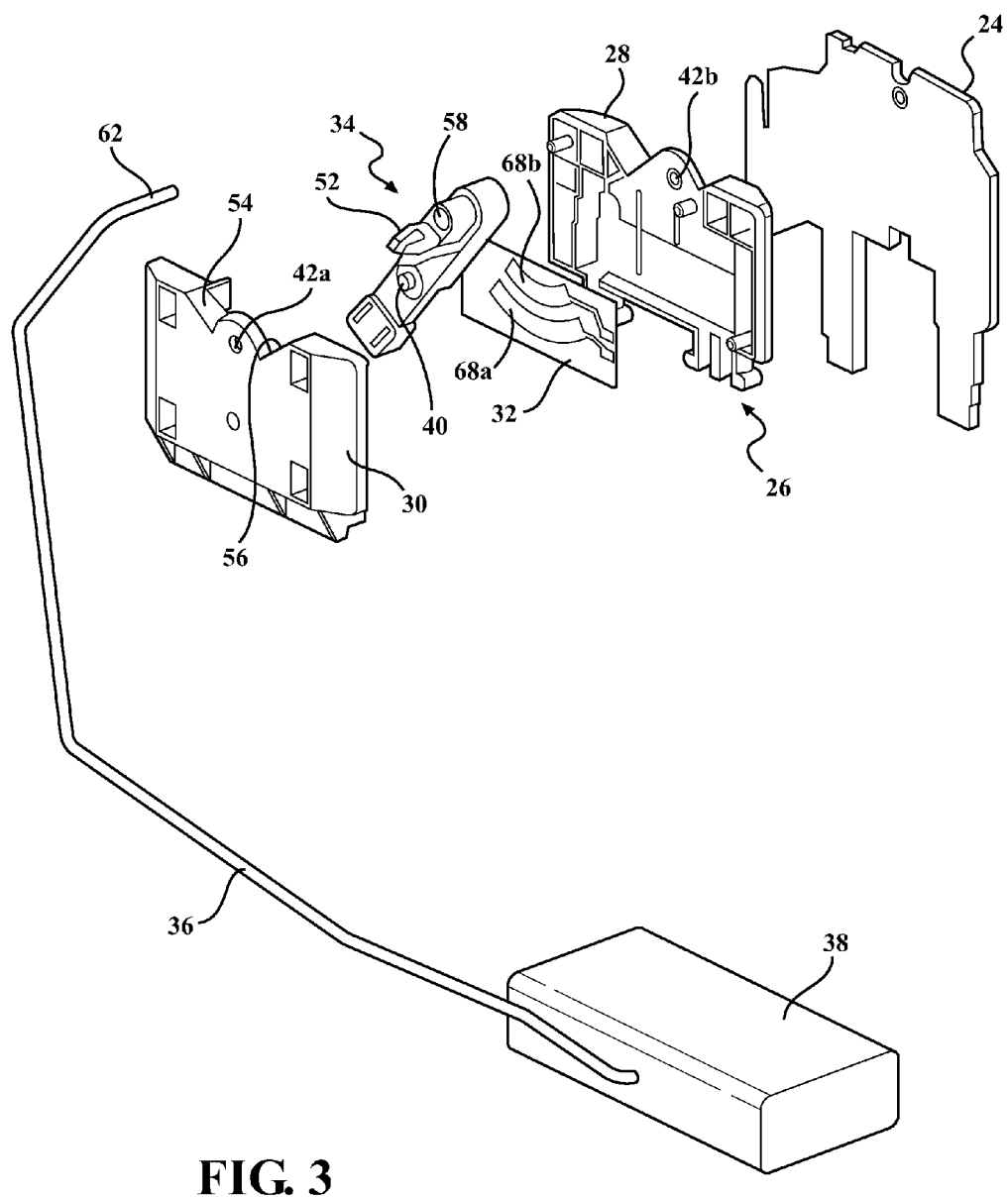
FIG. 3 is an exploded view of a sensor assembly, according to embodiments of the present invention.
Figure 4:
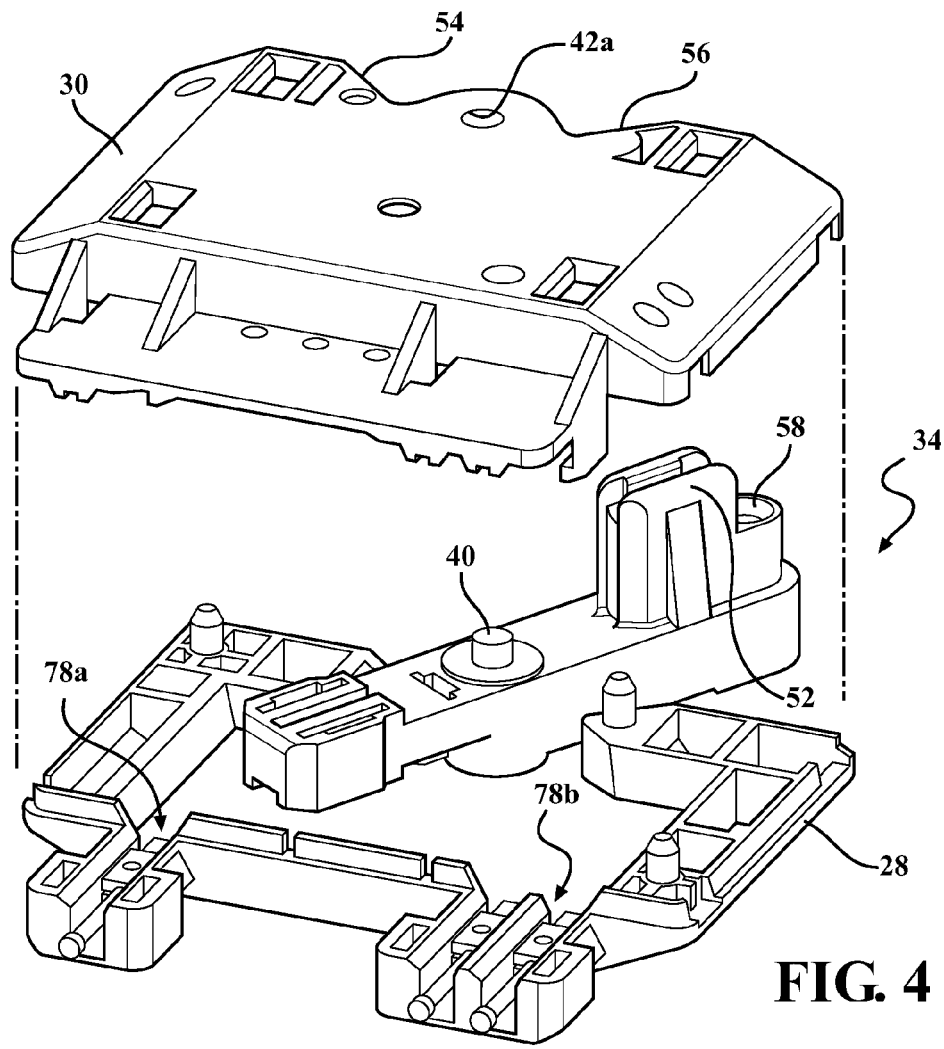
FIG. 4 is an exploded view of a housing, a cover, and a bracket assembly, which are part of a sensor assembly, according to embodiments of the present invention.
Figure 6A:
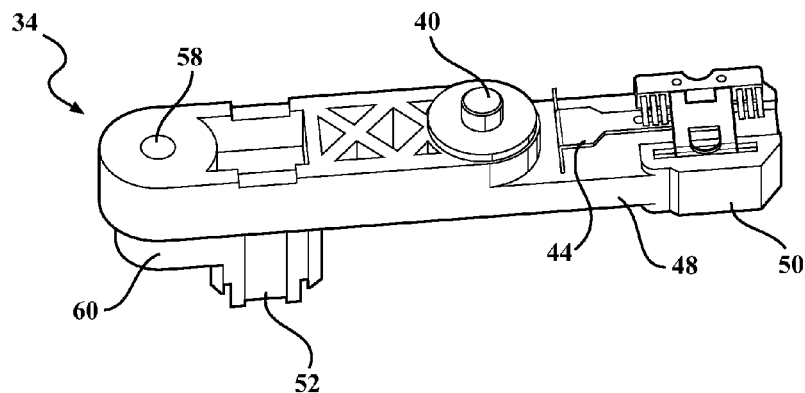
FIG. 6A is a perspective view of a bracket, which is part of a bracket assembly used as part of a sensor assembly, according to embodiments of the present invention.
Figure 6B:
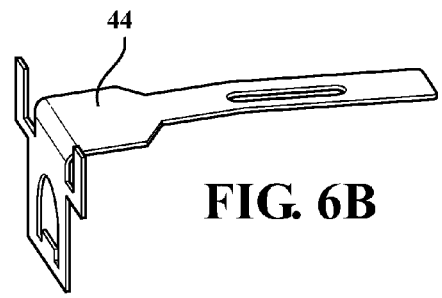
FIG. 6B is a perspective view of a spring, which is part of a bracket assembly used as part of a sensor assembly, according to embodiments of the present invention.
Figure 6C:
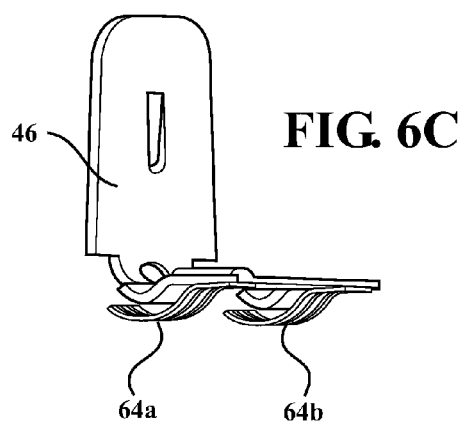
FIG. 6C is a perspective view of a contact spring, which is part of a bracket assembly used as part of a sensor assembly, according to embodiments of the present invention.
Figure 7:
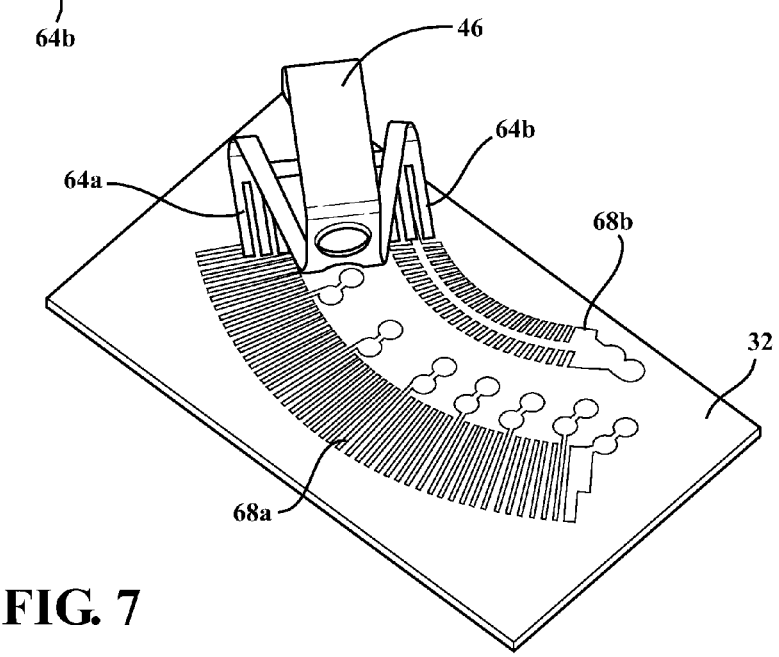
FIG. 7 is a perspective view of a contact spring in contact with a card, used as part of a sensor assembly, according to embodiments of the present invention.
Figure 8A:
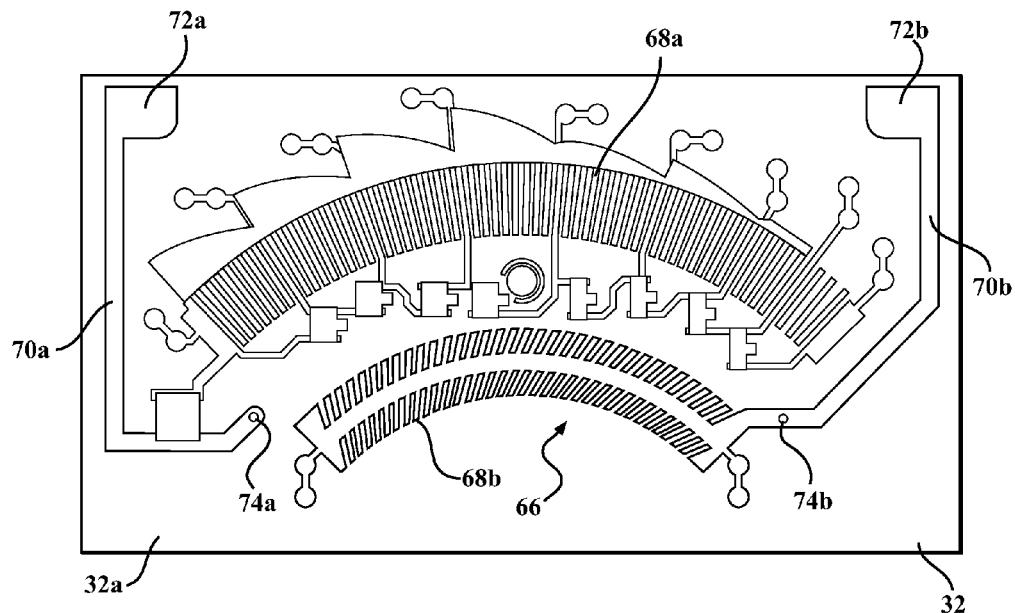
FIG. 8A is a perspective view of a first side of a card used as part of a sensor assembly, according to embodiments of the present invention.
Figure 8B:
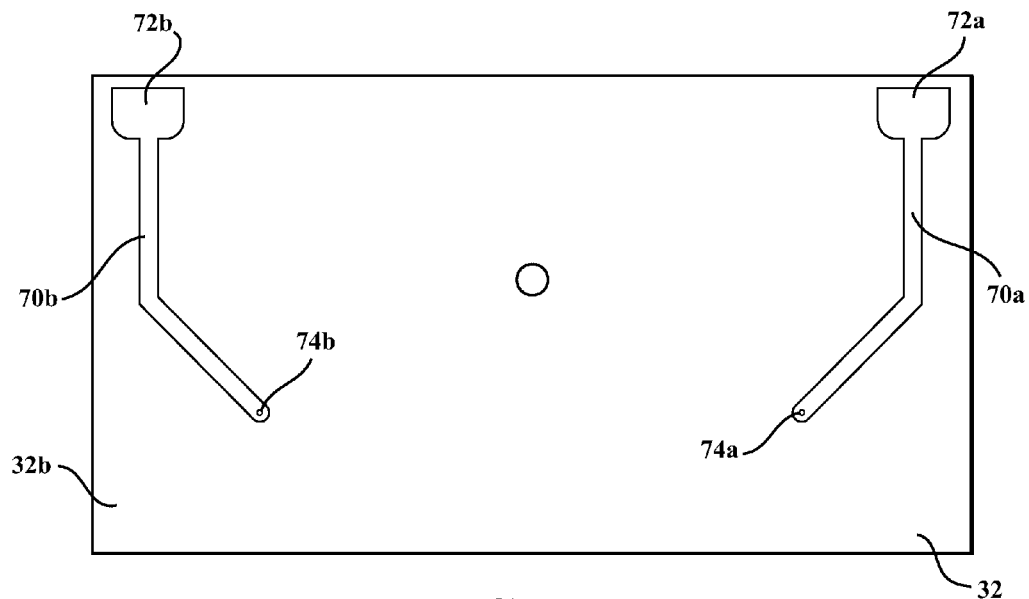
FIG. 8B is a perspective view of a second side of a card used as part of a sensor assembly, according to embodiments of the present invention.
Figure 9A:
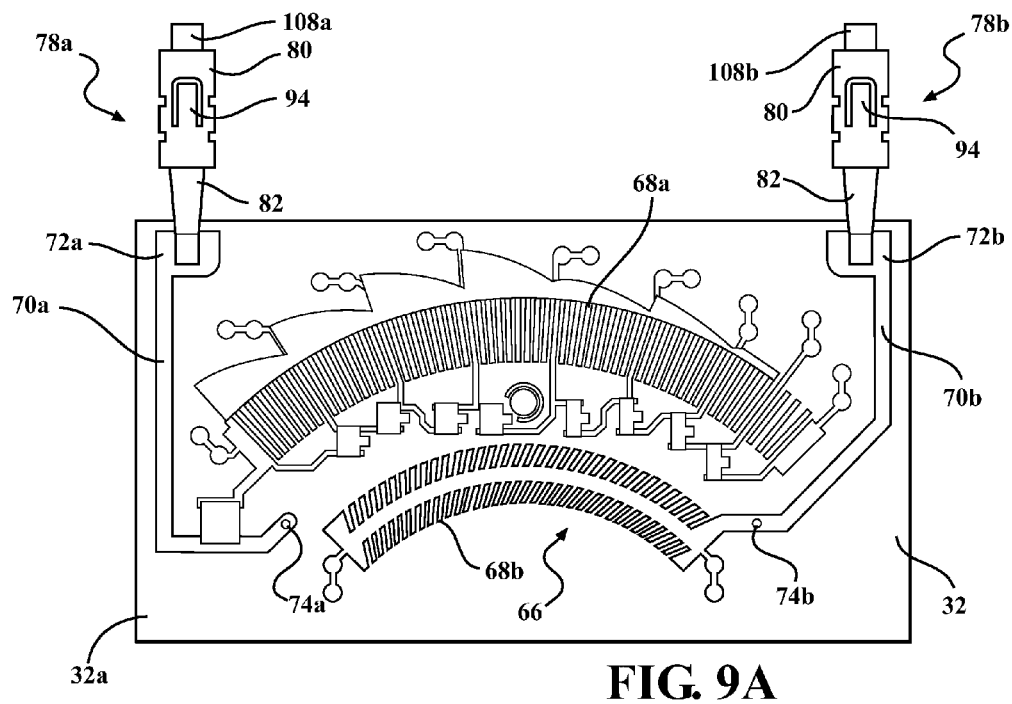
FIG. 9A is a perspective view of a first side of a card used as part of a sensor assembly, with connectors attached to the card, according to embodiments of the present invention.
Figure 9B:
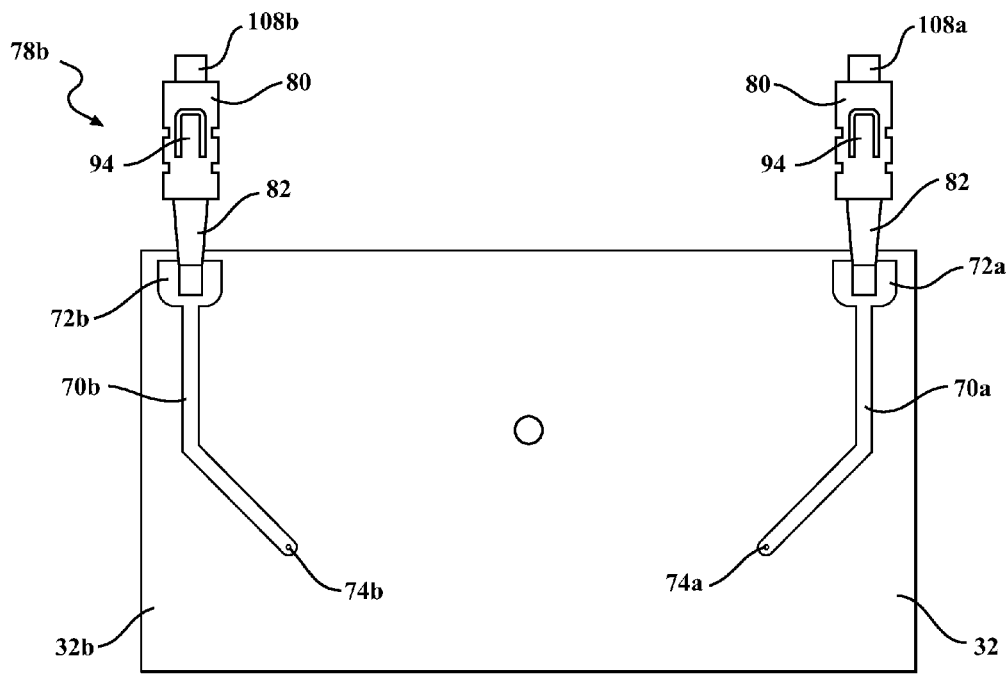
FIG. 9B is a perspective view of a second side of a card used as part of a sensor assembly, with connectors attached to the card, according to embodiments of the present invention.
Figure 11:
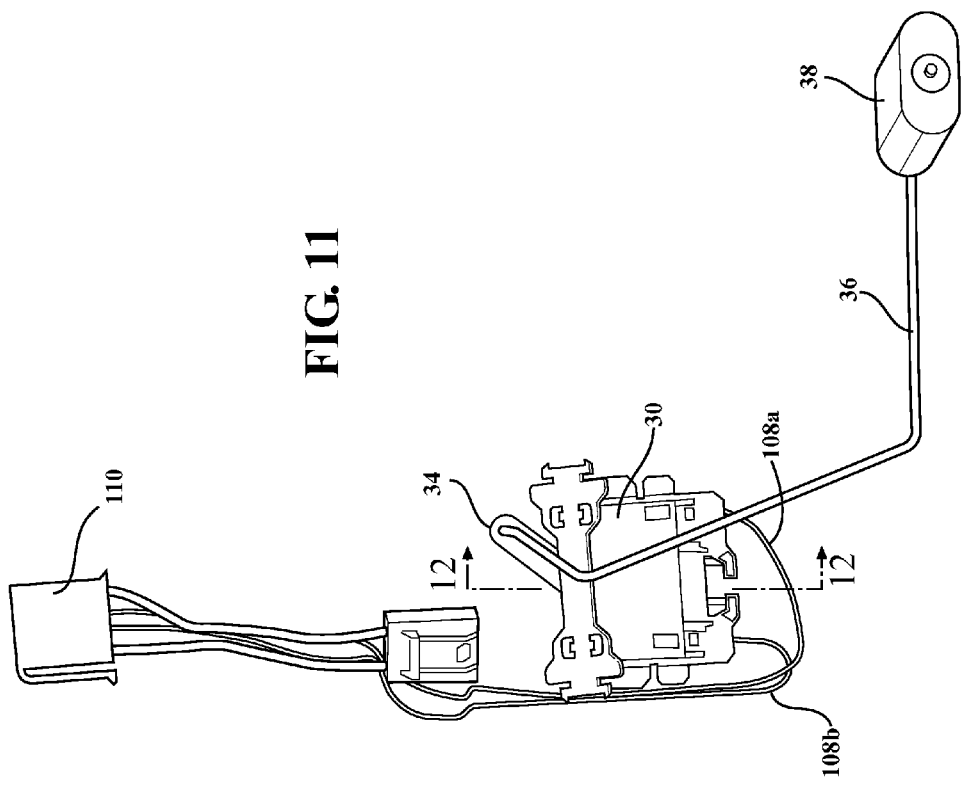
FIG. 11 is a perspective view of a sensor assembly and a connector, according to embodiments of the present invention.

The bracket assembly 34 includes a cylindrical support member 40 partly disposed within a recess 42a formed as part of the cover 30 and partly disposed in a corresponding recess 42b formed as part of the housing 28, such that the bracket assembly 34 is able to pivot relative to the cover 30 and the housing 28. The bracket assembly 34 also includes a spring 44 and a contact spring 46, where the contact spring 46 is mounted to a bracket 48 and is in contact with the card 32. The spring 44 is connected to an end portion 50 of the bracket 48, and the contact spring 46 is connected to the spring 44 and the end portion 50, best seen in FIGS. 3-4 and 6A.

Formed as part of the bracket 48 is an extension 52, which extends over a portion of the cover 30. More specifically, the extension 52 moves with the bracket 48 relative to the cover 30 and housing 28, and is selectively in contact with a first stopping surface 54 or a second stopping surface 56. The surfaces 54,56 determine the maximum distance the bracket assembly 34 is able to pivot relative to the housing 28 and the cover 30. The extension 52 contacts either surface 54,56, preventing the bracket assembly 34 from pivoting beyond either surface 54,56.

The bracket 48 also includes an aperture 58 formed as part of a second end portion 60 of the bracket 48. And end portion 62 of the lever assembly 36 is pivotally disposed in the aperture 58, and allows the lever assembly 36 to pivot relative to the bracket 48.

The contact spring 46 includes two spring portions, a first spring portion 64a and a second spring portion 64b are in contact with the TFN card 32. The card 32 includes a circuit, shown generally at 66, made of conductive ink. The circuit 66 includes a first arcuate portion 68a which is in electrical communication with a first pad circuit 70a, and a second arcuate portion 68b, which is in electrical communication with a second pad circuit 70b, where both the pad circuits 70a,70b are also part of the circuit 66. The first arcuate portion 68a is in contact with the first spring portion 64a, and the second arcuate portion 68b is in contact with the second spring portion 64b. The spring portions 64a,64b are flexible, and are therefore able to compensate for variations in tolerance of the card 32, and small changes in shape due to temperature variations as well.

Figure 10:
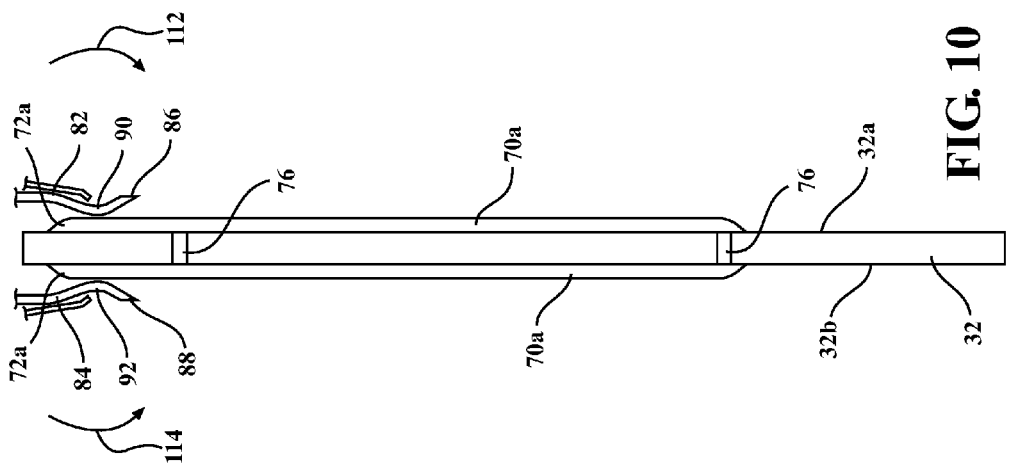
FIG. 10 is a partial side view of a card used as part of a sensor assembly, according to embodiments of the present invention.

The circuit 66 also includes a first pad 72a which is part of the first pad circuit 70a, and a second pad 72b which is part of the second pad circuit 70b. The first pad 72a and first pad circuit 70a are in electrical communication with a first via 74a, and the second pad 72b and second pad circuit 70b are in electrical communication with a second via 74b. Portions of the circuit 66 are formed on both sides of the card 32. More specifically, each of the pad circuits 70a,70b and the pads 72a,72b are formed on a first side 32a of the card 32 and a second side 32b of the card 32. Each of the vias 74a,74b extend through the card 32, to provide for electrical communication on both sides of the card 32, such that the portions of the pad circuits 70a,70b are in communication with one another. There are also contacts 76 formed as part of the circuit 66, which extend through the card 32 as shown in FIG. 10, which also provide for communication between the pad circuits 70a,70b, such that the pad circuits 70a,70b are in electrical communication with one another.

Referring now to FIGS. 9A-10 and 12-13, there is a first connector 78a connected to the card 32 in such that the connector 78a is in contact with the first pad 72a. There is also a second connector 78b connected to the card 32 such that the second connector 78b is in contact with the second pad 72b. In one embodiment, the connectors 78a,78b are clip-type connectors, but it is within the scope of the invention that other types of connectors may be used.

Figure 5:
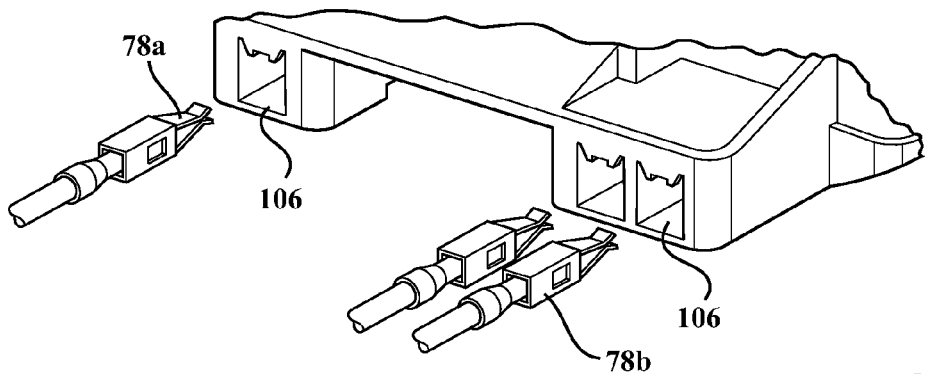
FIG. 5 is a perspective view of a plurality of connectors located in proximity to a plurality of cavities, which are part of a sensor assembly, according to embodiments of the present invention.
Figure 12:
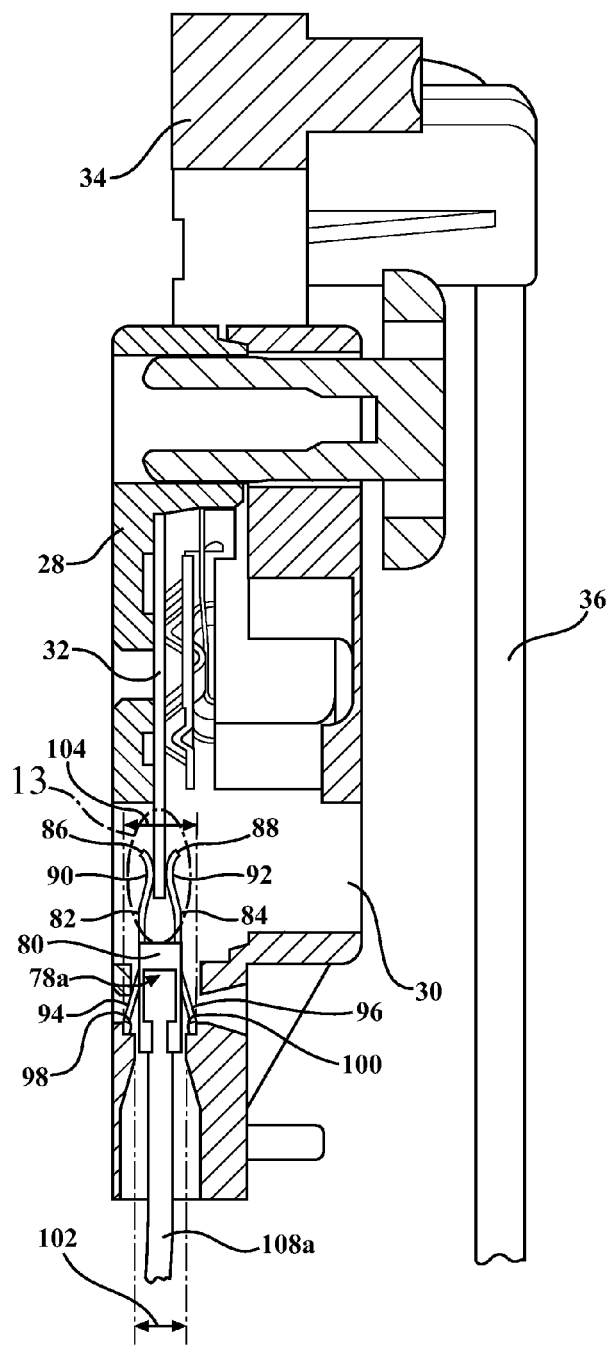
FIG. 12 is a sectional view taken along lines 12-12 of FIG. 11.
Figure 13:
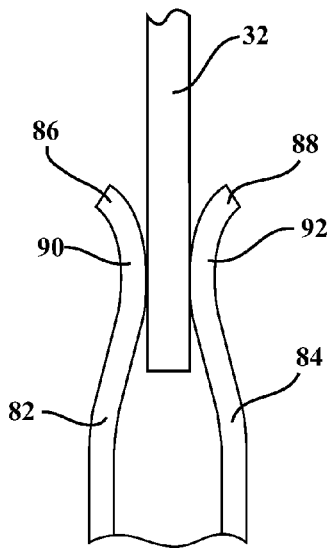
FIG. 13 is an enlarged view of the rectangular portion of FIG. 12.

The first connector 78a includes a connector housing 80, and formed as part of the connector housing 80 is a first flange portion 82 and a second flange portion 84. Formed as part of the first flange portion 82 is a first protrusion 86, and formed as part of the second flange portion 84 is a second protrusion 88. The flange portions 82,84 are curved toward one another, and the each protrusion 86,88 is curved away from one another, as shown in FIGS. 5 and 12-13. The difference in curvature of the flange portions 82,84 and protrusions 86,88 forms first and second inflection points 90,92, respectively. When the first connector 78a is not connected to the card 32, the flange portions 82,84 are positioned such that the inflection points 90,92 are very close, but not touching one another, best seen in FIG. 5.

When the first connector 78a is connected to the card 32, the first flange portion 82 is in contact with one side of the pad 72a at the first inflection point 90, and the second flange portion 84 is in contact with a second side of the pad 72a at the second inflection point 92. During assembly, the first connector 78a is moved toward the card 32, such that each of the protrusions 86,88 contact the card 32 first. When enough force is applied to the connector 78a, the flange portions 82,84 and protrusions 86,88 deflect, and the card 32 moves between the inflection point 90,92 and contacts the pads 72a,72b, respectively, as shown in FIGS. 10 and 12-13. The deflection of the flange portions 82,84 causes force to be applied to the card 32, ensuring an adequate connection between the connector 78a and pad 72a of the card 32.

Also integrally formed with the connector housing 80 is a first retention feature 94 and a second retention feature 96.

The retention features 94,96 extend at an angle away from the connector housing 80. There is also a first notch 98 formed as part of the housing 28, and a second notch 100 formed as part of the cover 30. The distance 102 between the inner surfaces of the two notches 98,100 when the housing 28 and the cover 30 are connected together is less than the maximum distance 104 between the portions of the retention features 94,96 that are furthest away from one another. The housing 28 and cover 30 form several cavities 106, and the notches 98,100 are located in the cavities 106. During assembly, the connector 78a is inserted into one of the cavities 106, as shown in FIGS. 5 and 12-13. As the connector 78a is inserted, the part of the cavity 106 that is narrower than the distance 104 causes the retention features 94,96 to deflect, and once the connector 78a is inserted into the cavity 106 such that the retention features 94,96 have moved beyond the notches 98,100, the retention features 94,96 are no longer deflected, and move back to their original positions such that the maximum distance 104 between the portions of the retention features 94,96 is greater than the distance 102 between the inner surfaces of the two notches 98,100. Once this occurs, if there is force applied to the connector 78a to attempt to remove the connector 78a from the cavity 106, the retention features 94,96 move and contact the notches 98,100, respectively, and the connector 78a is therefore prevented from being removed from the cavity 106.

Figure 2:
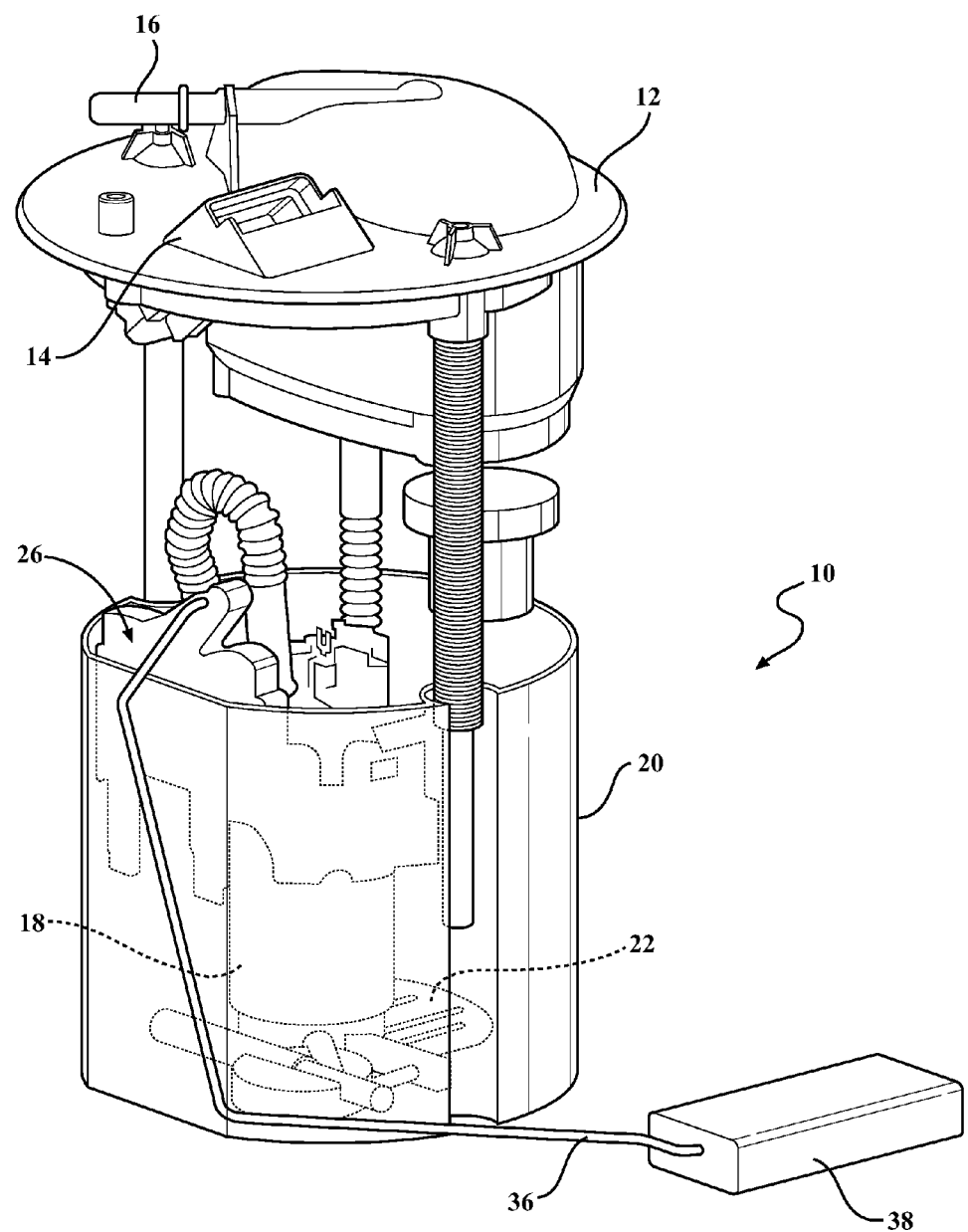
FIG. 2 is a second perspective view of a fuel module having a sensor assembly, according to embodiments of the present invention.

The second connector 78b has similar components to the first connector 78a, and functions in a similar manner, and therefore does not need to be described. There is a first wire 108a connected to the connector housing 80 of the first connector 78a, and a second wire 108b connected to the connector housing 80 of the second connector 78b. Each of the wires 108a,108b are connected to a connector 110, and the connector 110 is then connected to the portion of the connector 14 that extends downwardly from the flange 12, as shown in FIGS. 1-2.

Because there is conductive ink used on both sides of the card 10 to create the pad 72a, there is electrical communication between both flange portions 82,84 and the circuit 66. In addition to the connector 78a remaining in contact with the card 32 if a force is applied to the card 32 to pull the connector 78a away from the card 32, the connector 78a is also able to remain in contact with the pad 72a when other forces, such as rotational forces, are applied to the connector 78a. If a rotational force is applied to the connector 78a in the direction of the first arrow 112, such that the second flange portion 84 is no longer in contact with the pad 72a, the first flange portion 82 remains in electrical contact with the pad 72a. Additionally, if there is a rotational force applied to the connector 78a in the direction of the second arrow 114 such that the first flange portion 82 is no longer in contact with the pad 72a, the second flange portion 84 remains in electrical contact with the pad 72a. This also applies to the connector 78b connected to the second pad 72b as well.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. An apparatus, comprising:
   a card having a thick film network, including:
   a circuit formed on the card;
   at least one pad formed on both sides of the card, the pad being part of the circuit;

at least one connector connected to the at least one pad, placing the connector in electrical communication with the circuit;
a first flange portion being part of the at least one connector, the first flange portion in contact with one side of the at least one pad, the first flange portion remains in electrical contact with the at least one pad when force is applied to the at least one connector in one or more directions;
a second flange portion being part of the at least one connector, the second flange portion in contact with another side of the at least one pad;
at least one pad sender in electrical communication with the pad;
at least one via in electrical communication with the at least one pad sender, providing communication between portions of the at least one pad sender and the at least one pad on both sides of the card;
at least one arcuate portion in electrical communication with the at least one pad sender, and the at least one connector is connected to the at least one pad such that the at least one connector is in electrical communication with the at least one pad sender and the at least one arcuate portion;
a cover;
a bracket assembly in sliding contact with the at least one arcuate portion, the bracket assembly being disposed between the cover and the housing;
a lever assembly connected to the bracket;
a float connected to the lever assembly, and as the float changes position, the lever assembly pivots relative to the bracket assembly and the float, and the bracket assembly pivots relative to the card such that the location of the bracket assembly relative to the at least one arcuate portion changes, changing the configuration of the circuit, and the circuit sends a signal indicating the position of the float;
a connector housing being part of the connector, the first flange portion and the second flange portion integrally formed with the connector housing;
a first protrusion integrally formed with the first flange portion;
a second protrusion integrally formed with the second flange portion;
a first inflection point located at the connection between the first flange portion and the first protrusion;
a second inflection point located at the connection between the second flange portion and the second protrusion;
a first retention feature integrally formed with the connector housing; and
a second retention feature integrally formed with the connector housing;
wherein the first protrusion and the second protrusion contact the card when the first connector is being connected to the card such that the force applied to the first connector causes the first flange portion, second flange portion, first protrusion, and second protrusion to deflect, allowing the card to be placed between the first inflection point and the second inflection point, placing the first connector in electrical communication with the first pad.

2. The apparatus of claim 1, further comprising:
a housing connected to the cover;
wherein the bracket assembly is pivotally connected to the cover and the housing, such that the bracket assembly is located between the housing and the cover.

3. The apparatus of claim 2, further comprising:
a first notch formed as part of the housing;
a second notch formed as part of the cover; and
a plurality of cavities formed by the connection between the cover and the housing;
wherein the first retention feature is in contact with the first notch and the second retention feature is in contact with the second notch when the first connector is located in one of the plurality of cavities, and first connector is connected to the card, such that the first connector is prevented from being pulled away from the card.

4. The apparatus of claim 1, further comprising:
a first connector connected to a first pad, a portion of the first pad being on both sides of the card; and
a second connector connected to a second pad, a portion of the second pad being on both sides of the card;
wherein the first connector is in contact with both sides of the first pad, and the second connector is in contact with both sides of the second pad.

5. The thick film network sensor assembly of claim 1, wherein the circuit is made of conductive ink.

6. The thick film network sensor assembly of claim 1, wherein the card is made of ceramic material.

7. A sensor assembly, comprising:
a card;
a circuit disposed on the card,
a first pad located on the card, the first pad being part of the circuit;
a second pad located on the card, the second pad being part of the circuit;
a first connector connected to the first pad;
a second connector connected to a second pad;
a first arcuate portion located on the card, the first arcuate portion being part of the circuit;
a second arcuate portion located on the card, the second arcuate portion being part of the circuit;
at first pad sender located on the card and placing the first pad in electrical communication with the first arcuate portion, the first pad sender being part of the circuit;
at second pad sender located on the card and placing the second pad in electrical communication with the second arcuate portion, the second pad sender being part of the circuit;
at first via in communication with the first pad sender, such that the first via provides communication between portions of the first pad sender on both sides of the card;
a second via in communication with the second pad sender such that the second via provides communication between portions of the second pad sender on both sides of the card;
a bracket assembly in sliding contact with the first arcuate portion and the second arcuate portion;
a housing;
a cover connected to the housing, the bracket assembly is located between the cover and the housing, such that the bracket assembly is pivotally connected to the cover and the housing;
a first notch connected to the housing;
a second notch connected to the cover;
a plurality of cavities, and the first notch is located in proximity to the second notch, and the first notch and second notch are located in proximity to at least one of the plurality of cavities when the housing is connected to the cover;
a connector housing being part of the first connector;

a first retention feature integrally formed with the connector housing;
a second retention feature integrally formed with the connector housing;
a first flange portion integrally formed with the connector housing; and
a second flange portion integrally formed with the connector housing, and the first retention feature is in contact with the first notch and the second retention feature is in contact with the second notch, maintaining the first flange portion in contact with one side of the first pad, and the second flange portion in contact with another side of the first pad;
wherein as the bracket assembly changes position relative to the first arcuate portion and the second arcuate portion, the resistance of the circuit changes such that a signal indicative of the position of the bracket assembly is generated by the circuit.

8. The sensor assembly of claim 7, the first connector further comprising:
a first protrusion integrally formed with the first flange portion;
a second protrusion integrally formed with the second flange portion;
a first inflection point located at the connection between the first protrusion and the first flange portion; and
a second inflection point located at the connection between the second protrusion and the second flange portion;
wherein the first protrusion and the second protrusion contact the card when the first connector is being connected to the card such that the force applied to the first connector causes the first flange portion, second flange portion, first protrusion, and second protrusion to deflect, allowing the card to be placed between the first inflection point and the second inflection point, placing the first connector in electrical communication with the first pad.

9. The sensor assembly of claim 7, further comprising:
a lever assembly connected to the bracket assembly; and
a float connected to the lever;
wherein as the float changes position, the lever assembly pivots relative to the bracket assembly and the float, and the bracket assembly pivots relative to the first arcuate portion and the second arcuate portion such that the configuration of the circuit changes, and the circuit generates a signal indicating the position of the float.

10. The thick film network sensor assembly of claim 7, wherein the circuit is made of conductive ink.

11. The thick film network sensor assembly of claim 7, wherein the card is made of ceramic material.

12. The thick film network sensor assembly of claim 7, wherein a portion of the first pad, a portion of the second pad, a portion of the first pad sender, and a portion of the second pad sender are formed on both sides of the card.

13. A thick film network sensor assembly, comprising:
a card;
a circuit disposed on the card, the circuit having at least one arcuate portion;
at least one pad being part of the circuit;
at least one pad sender being part of the circuit;
at least one via being part of the circuit;
at least one connector connected to the pad;
a housing;
a cover connected to the housing, the card and connector disposed between the cover and the housing;
a bracket assembly in sliding contact with the at least one arcuate portion, the bracket assembly being disposed between the cover and the housing;
a lever assembly connected to the bracket;
a float connected to the lever assembly, the float changes position based on a fuel level, causing the lever assembly and bracket assembly to change position, such that the bracket assembly changes position relative to the at least one arcuate portion, changing the configuration of the circuit such that the fuel level is detected;
a first notch formed as part of the housing;
a second notch formed as part of the cover;
a plurality of cavities formed by the connection between the cover and the housing, and the first notch and the second notch are in proximity to at least one of the plurality of cavity when the cover is connected to the housing;
a connector housing;
a first flange portion formed as part of the connector housing;
a second flange portion formed as part of the connector housing;
a first protrusion integrally formed with the first flange portion;
a second protrusion integrally formed with the second flange portion;
a first inflection point located at the connection between the first flange portion and the first protrusion;
a second inflection point located at the connection between the second flange portion and the second protrusion;
a first retention feature integrally formed with the connector housing; and
a second retention feature integrally formed with the connector housing;
wherein the at least one connector is inserted into one of the plurality of cavities such that the first protrusion and second protrusion contact the card, and when enough force is applied to the at least one connector, the first protrusion, second protrusion, first flange portion, and second flange portion deflect, causing the first inflection point to contact one side of the pad, and the second inflection point to contact another side of the pad, the first retention feature to contact the first notch, and the second retention feature to contact the second notch, maintaining the position of the at least one connector in the one of the plurality of cavities.

14. The thick film network sensor assembly of claim 13, wherein the circuit is made of conductive ink.

15. The thick film network sensor assembly of claim 13, the card being made of ceramic material.

16. The thick film network sensor assembly of claim 13, wherein a portion of the pad and a portion of the pad sender are formed on both sides of the card.

17. The sensor assembly of claim 13, the bracket assembly further comprising:
a bracket pivotally mounted between the cover and the housing;
a spring connected to the bracket; and
a contact spring connected to the bracket and in contact with the spring;
wherein the contact spring is in contact with the at least one arcuate portion of the circuit, and as the contact spring contacts different areas of the at least one arcuate portion, the circuit produces a signal corresponding to the position of the bracket assembly.

* * * * *